Oct. 27, 1931.　　L. A. FRAYER ET AL　　1,829,558

METHOD OF MAKING NUT BLANKS

Filed June 27, 1930

INVENTORS
Lee A. Frayer
Carl L. Harvey
BY Kwis Hudson & Kent
ATTORNEYS

Patented Oct. 27, 1931

1,829,558

UNITED STATES PATENT OFFICE

LEE A. FRAYER AND CARL L. HARVEY, OF KENT, OHIO, ASSIGNORS TO ROY H. SMITH, OF KENT, OHIO

METHOD OF MAKING NUT BLANKS

Application filed June 27, 1930. Serial No. 464,246.

This invention relates to a method of making nut blanks, employing bar stock of the same cross sectional shape as that of the finished blank but of smaller cross sectional area.

One of the objects of the invention is the provision of a method which shall permit the manufacture of blanks of a great many different sizes from bar stock of a few sizes only.

Another object is the provision of a method of making nut blanks in which the amount of scrap is relatively small, in fact confined to the stock lost in punching the hole in the blank.

A further object is the provision of a method in which the wear upon and breakage of tools shall be small.

Other objects and features of novelty will appear as we proceed with the description of the procedure which, for the purposes of the present application, is illustrated in the accompanying drawings, wherein Figure 1 is a side or plan view of a piece of hexagonal bar stock showing where the bar may be severed to provide a length of material for the making of a nut blank in accordance with the invention.

It has been proposed at various times to manufacture nut blanks from bar stock by cutting therefrom lengths of stock somewhat in excess of the thickness of the desired blank, and compressing such lengths in a confined space, so as to properly shape and dimension the blank. These efforts have met with some degree of success where the increase in lateral dimensions has been kept small, that is to say where the diameter has been increased a matter of thousandths of an inch. Where attempts have been made to increase lateral dimensions beyond approximately ten thousandths of an inch however very serious difficulties have been encountered, due to the fact that the stock when compressed does not move uniformly. One piece may go to the left, with respect to the center of the confined space, and the next may go toward the right or in some other direction, and in order to make the stock fill the confined space it becomes necessary to employ extremely high pressures. Such high pressures not only mean the waste of considerable power, but they are also highly detrimental to dies, resulting in frequent breakage of these costly tools.

In the present invention we have eliminated the confining of the stock during its longitudinal compression, permitting it to expand laterally in a natural way, thereby enabling the use of a minimum amount of power. The process starts with bar stock of square or hexagonal shape, to correspond with the shape of the desired blank. When the stock is compressed it retains this form, except that the sides are bowed outwardly more or less, the amount of such bowing being dependent upon the extent of the compression. The compressed length of stock is then passed through a reducing die, the bowed walls facilitating this operation, and the wrench facets of the blank are thus flattened and trued up. These are the essential steps of the method. The piercing of the blank, the formation thereupon of a crown and the production of countersinks therein may be accomplished in various ways, although the preferred procedure is disclosed herein and will be referred to more particularly as we proceed with a detailed description of the invention.

Figure 1:
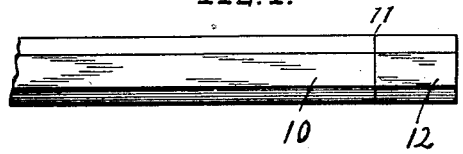
Figure 2:
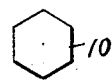
Fig. 2 is an end view of the same.
Figure 3:
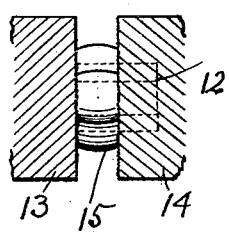
Fig. 3 is a fragmental view of a pair of anvils with a compressed length of stock therebetween, the original piece being indicated in the same view in dotted lines.
Figure 4:
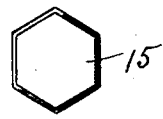
Fig. 4 is an end view of the same.

In the drawings we have indicated at 10 a bar of hexagonal stock such as we employ for the production of hexagonal blanks. Where blanks of other shapes are desired, the bar stock employed will correspond in cross section with the cross section of the blank. In Fig. 1 we have indicated at 11 a cut which may be made across the bar 10 in order to sever from the bar a length of stock 12 such as may be used in carrying out the further steps of the method. This length of stock is then placed between flat faced anvils 13 and 14, Fig. 3, the work surfaces of which are preferably slightly roughened in order to provide good frictional contact with the work and prevent its slipping or moving transversely. The original length of stock 12 is indicated in this figure by dotted lines. Pressure is exerted to cause the anvils 13 and 14 to move toward each other to the position indicated in Fig. 3, whereby the length of stock 12 is compressed and the stock expanded laterally to form the blank 15. This blank has bowed walls and corners as illustrated. The amount of bowing increases with the amount of compression, and this compression may be any quantity. However, the original length of the stock must not exceed three times its diameter, approximately. Stock of greater length is apt to buckle or bend instead of being merely compressed and expanded laterally.

Figures 5, 6:
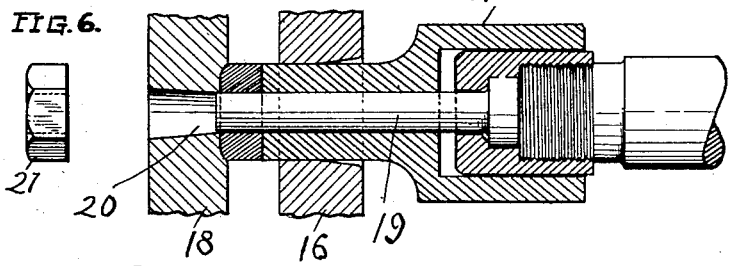
Fig. 5 is a diagrammatic, sectional view showing a blank that has been forced through a reducing die and has been pierced and crowned, together with the dies and punches for accomplishing these operations.

The next step of the method is to shape the side walls of the blank by passing it through a reducing die 16, Fig. 5. This may be accomplished by means of a hollow punch 17 which closely fits the hole in the exit portion of the die. In this step of the method the walls of the blank are flattened, trued up and dimensioned. While we have termed the die 16 a reducing die, it will be apparent that its function is not alone reducing, as it actually increases the cross sectional area at that face of the blank which is last to enter the die. In other words the excess metal taken from the outwardly bowed portion is driven back to straighten up the side walls of the blank. Hence the function of the die is to reduce the blank in its middle section and enlarge it at one end face. Further movement of the hollow punch 17 may be caused to force the blank against a crowning die 18, after which the movement of the punch 17 ceases and the movement of a piercing punch 19, slidable within the punch 17, begins. The forward end of the piercing punch 19 enters a hole 20 in the die 18, and the slugs punched from the blanks are discharged through this hole.

Figure 7:
Figs. 6 and 7 are edge and end views, respectively, of the blank at this stage of its manufacture.

When these operations are completed the blank takes the form illustrated at 21 in Figs. 6 and 7, that is to say it is crowned and pierced, but not countersunk.

Figure 8:
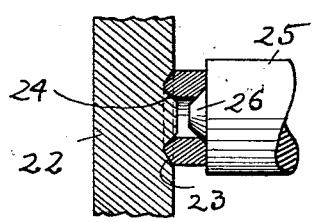
Fig. 8 is a fragmental view, partly in section, of a blank compressed between a countersinking die and punch.
Figure 9:
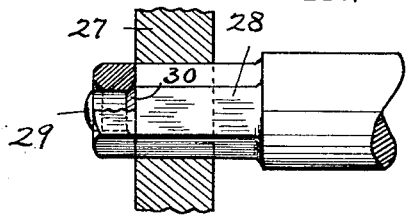
Fig. 9 is a similar view of a blank after it has passed through a second finishing die, showing the die and the punch, the latter having a pilot upon which the blank is supported and by which its hole is dimensioned.

The countersinking of both ends of the hole may be accomplished by the means illustrated in Fig. 8, wherein the die 22 is formed with a concave surface 23 to receive the crowned surface of the blank and with a cone 24 which acts to countersink one end of the hole in the blank. A punch 25 carrying a cone projection 26 for forming the countersink on the rear of the blank, cooperates with the die 22 in a manner which will be obvious to those skilled in the art.

Now, in order to accurately finish both the exterior and interior surfaces of the blank, the latter may be passed through a finishing die 27 by means of a punch 28, upon the forward end of which is a pilot 29 that enters the hole in the blank and forms an accurate cylindrical surface against which the blank is compressed as it passes through the die. At the base of the pilot 29 there is a cone surface 30 which fits the countersink in the corresponding face of the blank.

Figure 11:
Fig. 11 is a face view of the crowned side or end of the blank.
Figure 10:
Fig. 10 is an edge view of the finished blank.
Figure 12:
Fig. 12 is a face view of the opposite side thereof.

The finished blank 31 is illustrated in Figs. 10, 11 and 12 of the drawings, the crowned end being shown in Fig. 11 and the rear end in Fig. 12.

In the method which we have above described there is no waste material except that lost by the punching of the hole in the blank. The blank when compressed is unconfined, and hence there are no enclosing die walls to be broken by excessive pressure. Various sizes and thicknesses of blanks may be made from a single size of bar stock, by the simple expedient of varying the length of stock severed from the bar and the degree of compression of that length. By our method we are enabled to increase the cross sectional area of the stock as much as seventy percent, and the increases will in many cases be above forty percent. As an instance of what may be done we may mention that one-half inch stock may be employed for the manufacture of five-eighths inch, eleven-sixteenths inch and three-fourths inch blanks.

While in the foregoing description and in the accompanying drawings we have disclosed more or less in detail one particular embodiment of the invention, we desire it to be understood that such detail disclosure has been resorted to primarily for the purpose of fully illustrating the invention in compliance with the requirements of the statute, and that it is not to be construed as amounting to a limitation upon the scope of the invention.

Having thus described our invention, we claim:

1. A method of making nut blanks from cold stock, which comprises cutting from a bar of polygonal cross section a length of stock, compressing said length endwise between flat faced anvils without confining its side walls, whereby its side walls are bowed outwardly, and then pressing the blank through a reducing die of substantially the same shape as the original stock, and piercing it.

2. A method of making nut blanks, which comprises cutting from a bar of polygonal cross section a length of stock, compressing said length endwise between flat faced, rough surfaced anvils, whereby its side walls are bowed outwardly and then pressing the blanks through a reducing die of substantially the same shape as the original stock, and piercing it.

3. A method of making nut blanks, which comprises cutting from a bar of given polygonal cross section a length of stock greater than the thickness of the desired blank, compressing said length endwise between parallel flat surfaces without confining the side surfaces of the stock until the desired transverse dimensions are reached approximately, the sides of the blank being bowed outwardly thereby and then forcing the blank through a reducing die of substantially the same shape as the original stock but of larger size, and piercing it.

4. A method of making nut blanks, which comprises cutting from a bar of polygonal cross section stock materially exceeding in length the thickness of the desired blank, expanding said stock laterally by compressing it endwise between flat faced anvils, whereby its side walls are bowed outwardly and then pressing the blank through a reducing die of the same shape as the original stock but of greater size, and piercing the blank.

5. A method of making nut blanks which consists in cutting from a bar of polygonal cross section stock of a maximum length of three times its diameter, expanding said stock laterally in all directions by compressing it endwise between flat faced anvils, whereby its side walls are bowed outwardly and then pressing the blank through a reducing die of the same shape as but greater size than the original stock, and piercing the blank.

6. A method of making nut blanks which comprises cutting from a bar of polygonal cross section stock of a predetermined length, expanding said length laterally by compressing it endwise between flat faced anvils, whereby the wrench facets are bowed outwardly, and flattening the wrench facets by forcing the blank through a reducing die.

7. A method of making nut blanks which comprises cutting from a bar of polygonal cross section stock of a predetermined length, expanding said length laterally by compressing it endwise between flat faced anvils, whereby the wrench facets are bowed outwardly, and flattening, truing up and dimensioning the wrench facets by forcing the blank through a reducing die.

In testimony whereof, we hereunto affix our signatures.

LEE A. FRAYER.
CARL L. HARVEY.